Aug. 23, 1966  L. W. LLEWELLYN  3,268,053

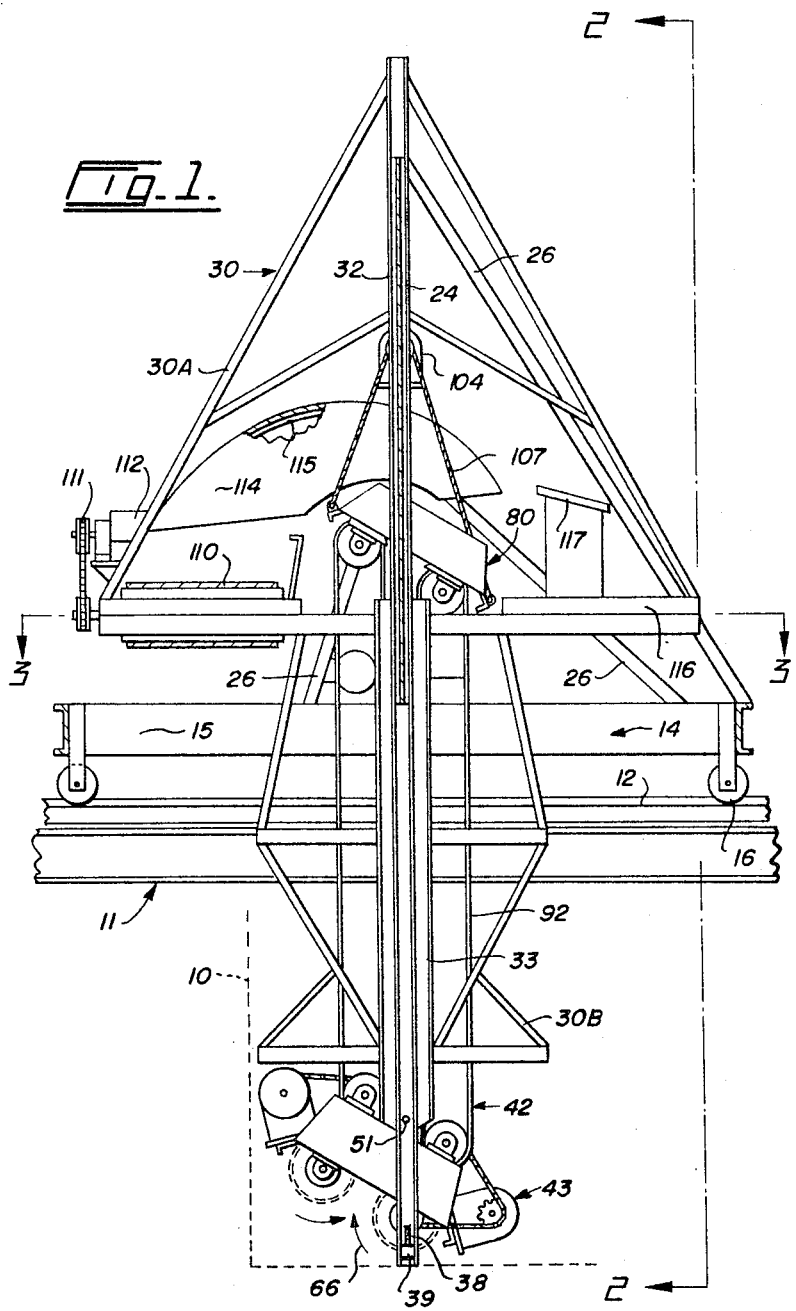

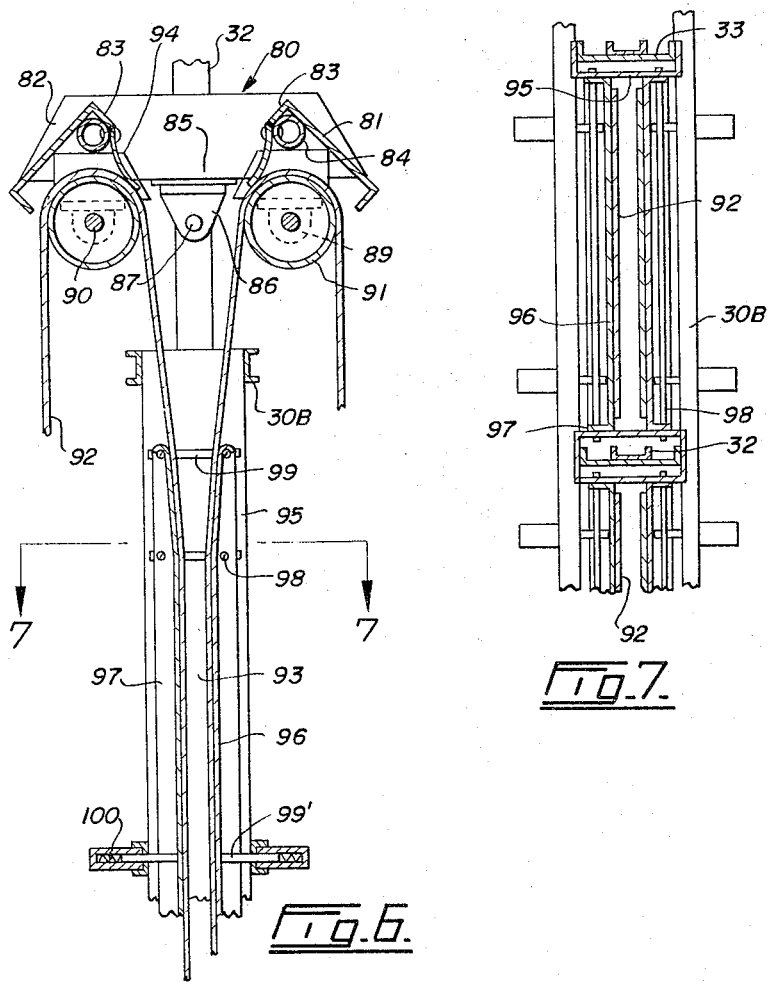
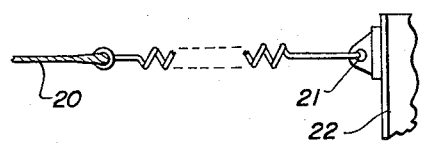

MATERIAL HANDLING APPARATUS

Filed Dec. 28, 1964  5 Sheets-Sheet 3

INVENTOR
LEOPOLD W. LLEWELLYN
Ernest E Carver
agent

Aug. 23, 1966  L. W. LLEWELLYN  3,268,053
MATERIAL HANDLING APPARATUS
Filed Dec. 28, 1964  5 Sheets-Sheet 4

INVENTOR
LEOPOLD W. LLEWELLYN

Ernest E Carver
Agent

INVENTOR
LEOPOLD W. LLEWELLYN

United States Patent Office 3,268,053
Patented August 23, 1966

3,268,053
MATERIAL HANDLING APPARATUS
Leopold W. Llewellyn, 4740 Southlawn Drive,
Burnaby, British Columbia, Canada
Filed Dec. 28, 1964, Ser. No. 421,438
7 Claims. (Cl. 198—9)

My invention relates to equipment which is particularly adapted for use in loading and unloading bulk cargos of divided material.

One such material which has always presented handling problems is wood chips as they are transported to the mill for processing into pulp stock. The chips normally are shipped in open-topped barges or railway cars and as a result often become compacted due to exposure to weather and the weight of such a large pile of material. In this condition bulk cargos of wood chips are difficult to handle by conventional apparatus such as pneumatic conveyor systems and the like.

Important objects of the present invention are to provide a pick-up head which can be used to raise a wide variety of divided materials and which is extremely effective even when the material is wet, frozen or otherwise compacted.

A further object is to provide means whereby the head may be rocked, prior to being moved horizontally through the material, to its most efficient angle of attack.

A still further object is to provide a vertical conveyor which will transfer material from the head to a discharge point at an extremely high rate of speed and which is capable of varying its capacity to conform to the feed rate of the head and the condition of the material.

These and additional objects and features will be disclosed in the following specification and be shown in the accompanying drawings.

Referring to the drawings:

FIGURE 1 is a vertical section of the invention taken on the line 1—1 of FIG. 2.

FIGURE 1A is a detail of the carriage cable anchor.

FIGURE 6 is a detail vertical section showing the pressure plates and the rocking head, said head being in a level position.

FIGURE 7 is a section taken on the line 7—7 of FIG. 6.

Figure 2:
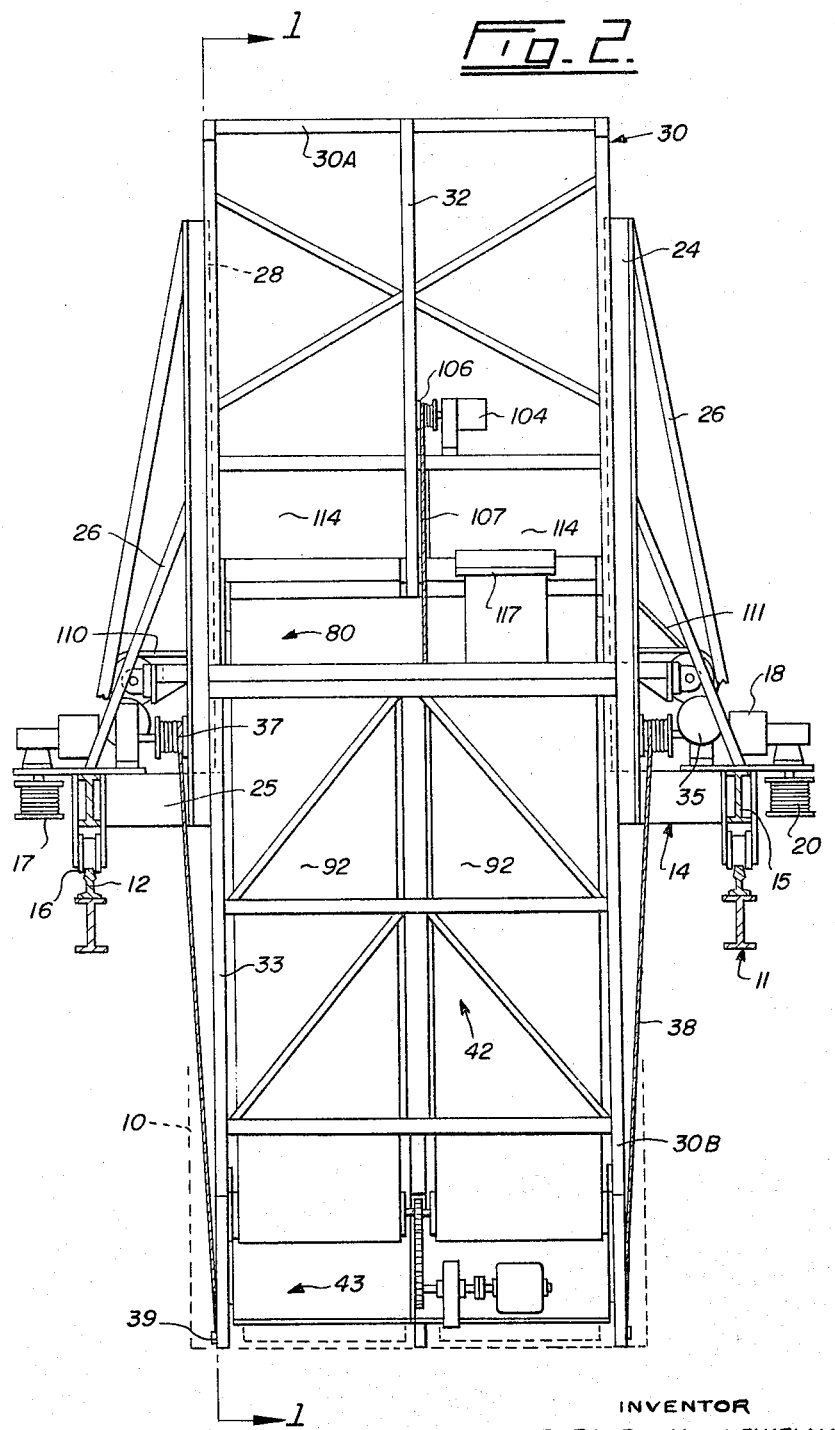
FIGURE 2 is a vertical section taken on the line 2—2 of FIG. 1.
Figure 3:
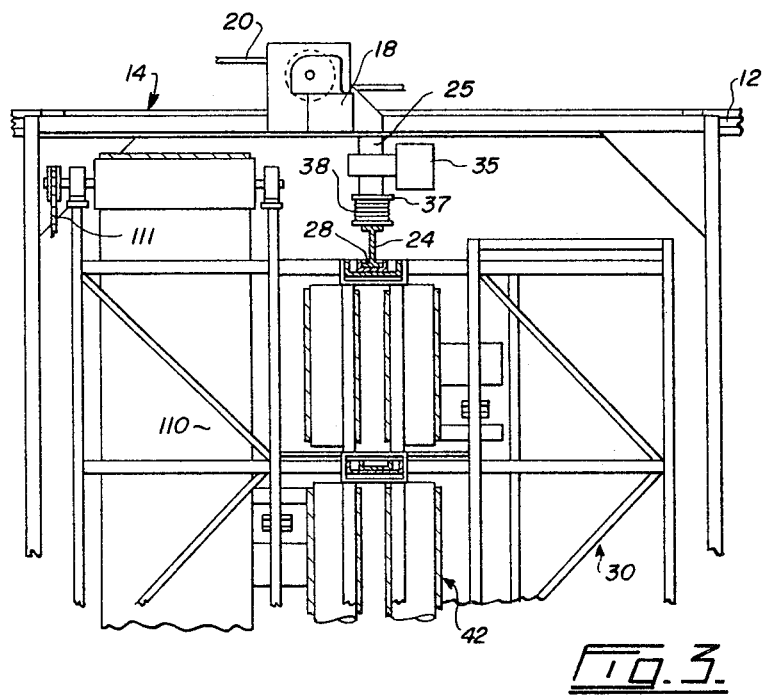
FIGURE 3 is a fragmentary plan taken on the line 3—3 of FIG. 1.

The apparatus which will be described here is specifically designed to unload gondola-type railway cars carrying pulp chips although it will be understood the device will serve equally as well in transferring similar material to and from other structures. For example, the basic apparatus may be used to move any granular or comminuted material from one site to another.

In this particular embodiment of the invention a section of the track along which the railway cars 10 are adapted to be shunted is surmounted by a framework generally indicated by the numeral 11. This framework includes side girders on which a pair of rails 12 are mounted.

The framework 11 provides a path of travel for the carriage 14 having a base frame 15. Wheels 16, carried by the sides of the base frame, ride upon the rails 12. Each carriage side member is fitted with a winding drum 17 and a reversible electric motor 18, through a suitable reducer, is operatively connected to said drum. A cable 20 has its centre portion wound around the drum 17 and its two ends are anchored as at 21 to cross members 22 at each end of the framework 11 see FIG. 1A only. Thus, the carriage may be moved back and forth along the rails 12.

The sides of the base frame 15 support central columns 24 which are carried on the inner ends of opposing brackets 25. Suitable braces 26 are provided to give the columns 24 the necessary strength and rigidity. The columns 24 are I-beams and their inner flanges form vertical guides 28 for an elevator frame 30.

The frame 30 has an upper portion 30A and a lower portion 30B, the latter being of relatively small cross sectional dimension. Transversely spaced upright 32 are provided on the elevator frame and, within the portion 30B, these uprights preferably are reinforced or backed by relatively wide channels 33. The uprights 32 are formed of narrow channels and the two side uprights embrace the guides 28 and allow the frame 30 to move vertically on the carriage 14 with the portion 30B extending through the base frame 15. Mounted on each carriage bracket 25 is an electric motor 35 which is operatively connected, through the usual reducer, to a winding drum 37 and this drum carries a length of cable 38. The end of the cable 38 extends down to the bottom of the frame portion 30B where it is secured as at 39 to the end of a side upright 32. This hoisting mechanism enables the elevator to be raised and lowered relative to the carriage and obviously the power of such a mechanism could be increased by training the cable 38 over suitably located pulleys on the carriage and elevator frame to provide, say, a triple purchase.

As shown in FIG. 2, the overall width of the lower portion of the frame 30 is about equal to the inner dimension of the car 10. The frame is of this width to support a chip hoisting mechanism generally indicated by 42. For convenience in manufacture and other obvious reasons I prefer to construct the mechanism 42 of two vertical conveyors arranged in side by side relation for unitary operation. It will be understood, however, that only one vertical conveyor may be required, depending on the size and shape of the material carrier.

The chip hoising mechanism 42 consists of a pick-up head 43 mounted on the lower end of the frame 30. The head is provided with inclined side members 45, cross members 46 and top members 47 which are spaced apart to define rectangular intake openings 48. Fitted to the top edges of the members 46 are bearings which serve as hangers 50 for the pick-up head. Adjacent their lower ends, the uprights 32 are fitted with pivot pins 51 and these pins are received in the hangers to pivotally secure the head to the frame.

The top members 47 have bearings 53 which journal the parallel shafts 54 of two pairs of pulleys 55. Also fitted to these shafts are centrally disposed sprockets 56. On the underside of the pick-up head, other parallel shafts 58 are carried in bearings 59 and these shafts have sprockets 60 in vertical alignment with the sprockets 56. Each side member 45 supports an electric motor 62 and its reducer with a sprocket 64 being secured to the output shaft of the reducer. A chain 65 operatively connects the sprockets 56, 60 and 64 on each side of the pick-up head. By means of the motors 62, the several shafts are adapted to be driven simultaneously in the direction indicated by the arrows 66.

Figure 5:
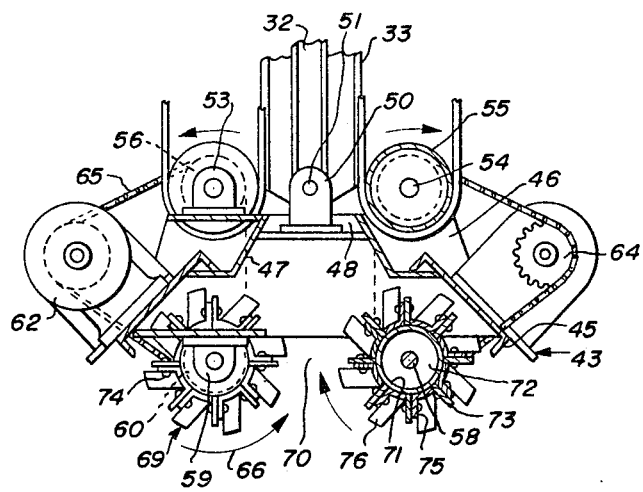
FIGURE 5 is a vertical section taken on the line 5—5 of FIG. 4.

Two pairs of feed rolls 69 are mounted on the shafts 58, these rolls being spaced apart to define intake throats 70 disposed directly below the rectangular openings 48. As shown best in FIG. 5, each feed roll has a cylindrical wall 71 and end walls 72 which are welded or otherwise secured to the supporting shaft 58. The roll 69 is provided with a number of radially disposed impeller blades 73 which extend the full length of the wall 71. I prefer to form these blades of rectangular strips of a hard wearing rubber-like material. A material which is particularly well suited for this purpose is known by the trademark "Uscathane" a product of the Dominion Rubber Co. Ltd. The blades 73 are secured by bolts 74 to metal backing strips 75 of angle iron or the like, these metal strips being suitably secured to the wall 71. Each strip 75 is provided with one raker bar 76, the bar being disposed at right angles to the adjoining blade 73 and extending radially outwards a short distance beyond the outer edge of said blade. The raker bars are spaced apart and are spirally arranged around the periphery of the impellers.

The upper portion 30A of the elevator frame is provided with a rocking head 80 see particularly FIG. 6. This top head has side members 81, cross members 82 and top members 83 and 84. Discharge openings 85 are defined between the top members of the head 80. Bearings 86 are secured to the underside of the members 82 and pivot pins 87, carried by the uprights 32, are journalled in said bearings. Other bearings 89 on the underside of the members 82 journal shafts 90 on which two pairs of pulleys 91 are mounted. Each pulley 91 is connected to a corresponding pulley 55 by a belt 92. The two pairs of endless belts 92 are thus arranged with their inner or opposing runs spaced apart to define material-carrying troughs 93. The opposing sides of the members 84 are fitted with scraper blades 94 of the same hard wearing rubber-like material as the impeller blades 73. One such scraper blade is provided above each pulley 91 with the free edge of said blade bearing against the belt to wipe it clean of particles of the material being raised by the mechanism 42.

As shown in FIGS. 6 and 7, the sides of the troughs 93 are closed by means of plates 95 which are mounted on parts of the frame 30. These side plates 95 support pressure plates 96 over which the inner runs of the belts 92 slide. The plates 96 have side flanges 97 and extending through said flanges adjacent the ends of said plates are horizontal rods 98. The ends of the rods 98 extend beyond the flanges 97 and project through slots 99 formed in the side plates 95. Fitted to a frame part near the rear face of each pressure plate are transversely spaced plungers 99'. The plungers are urged outwardly by adjustably mounted springs 100 and bear against said plates midway between the plate ends. In this manner, the pressure plates 96 are urged towards one another by spring pressure to maintain the desired tension on the belts 92, to limit the thickness of the trough 93 and to permit the plates to spread apart to some extent and rock about the plungers 99' should a large lump of material pass through the trough.

Referring now to FIGS. 1 and 2 it will be seen that the upper portion 30A of the elevator frame carries a reversible electric motor 104 which drives a drum 106 through the usual reducer. The centre part of a cable 107 is wound around this drum and its two ends are suitably secured to the top members 83 of the top or rocking head 80. By operation of the motor 104 the head 80 can be selectively rocked between two inclined positions each approximately 30° to the horizontal. Since the heads 80 and 43 are connected together by the belts 92, the pick-up head is tilted simultaneously with the top head to one of its two inclined operating positions.

The portion 30A of the frame is fitted with a transversely extending belt conveyor 110 which is operatively connected as at 111 to a reversible drive motor 112. Extending between the uprights 32 are a pair of transversely spaced deflectors 114 which are shaped to deflect material raised by the hoisting mechanism 42 on to the conveyor 110. The lower face of the deflector is protected from wear by a coating 115 of the rubber-like material used for the blades 73 and 94.

Adjacent the head 80 the frame portion 30A has a platform 116 which provides a work station for the operator of the material handling apparatus. A console 117 on the platform is fitted with the switches and the like needed to control the operation of the several above mentioned motors. By use of these switches the operator is able to move the carriage 14 back and forth upon its rails, raise and lower the elevator frame 30 and actuate the chip raising mechanism 42. The electric circuits to the motors include the usual limit switches and other safeguards against loss of control of movement of the apparatus.

Figure 8:
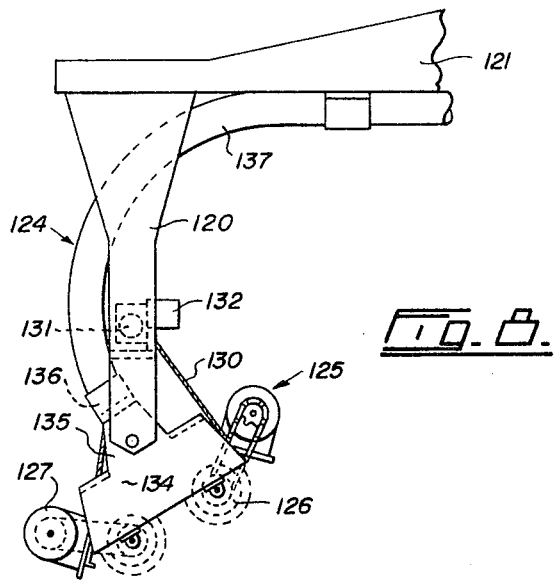
FIGURE 8 is a side elevation of a modified form of the invention.
Figure 4:
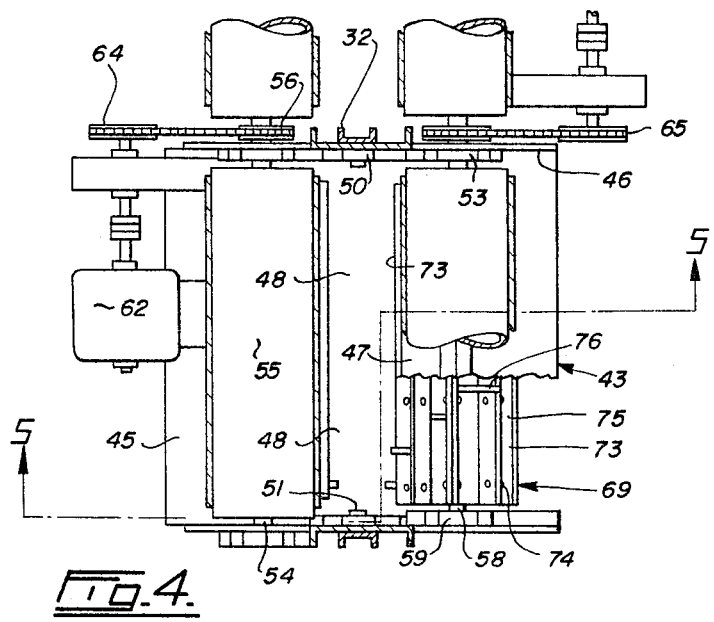
FIGURE 4 is detail plan of the pick-up head in a level position.

In the modification shown in FIG. 8 the framework 11 and carriage 14 are dispensed with and a vertically disposed frame 120 is mounted on the end of a horizontally extending boom 121. Suitable means, not shown, are provided whereby the boom may be raised and lowered and also moved horizontally under control of the operator. The chip hoisting mechanism 124 of the modified apparatus consists of a pick-up head 125 having a pair of feed rolls 126 driven by motors 127. A cable 130 connects the head to the winding drum 131 powered by a motor 132, the motor in this case being mounted on the frame 120 immediately above the head. The pick-up head 125 has an intake opening 134 which is covered by a hood 135. A flexible coupling 136 connects the hood to the lower end of a pipe 137, which pipe extends up through the frame 120 and along the boom 121 to a delivery point for the divided material. This pipe forms part of a suitable pneumatic conveyor system which is adapted to transfer material from the pick-up head to a point of discharge.

At the start of an unloading operation the elevator frame 30 is raised to its uppermost position on the carriage 14. In this raised position the pick-up head 43 is disposed above the top of the chip load carried within the box car 10. Preferably unloading is commenced at one end of the car whereupon the head 43 is tilted upwardly towards the opposite end of the car or in its intended direction of travel.

With the motors 62 operating to rotate the feed rolls 69 at an appropriate speed, the pick-up head is lowered some 12 inches into the chip pile and the motors 18 are started to move the carriage 14 along the rails 12. The impeller blades 73 draw chips into the throats 70 from where they are thrown by the rapidly rotating blades through the intake openings 48 into the troughs 93. The material travels through the troughs for the most part as a loosely packed body of wood chips but should an object larger than the normal width of the troughs be drawn upwardly it can be handled by the belts due to the resilient and rocking mounting of the pressure plates 96.

The chips are thrown from the troughs 93 through the discharge openings 85 and against the deflectors 114 which reverse their direction of travel and reduces their momentum so that they fall upon the transversely extending conveyor 110. This last conveyor discharges the chips over the side of the railway car where other suitable conveying means, not shown, is provided to transfer the material to a storage or other site.

In this manner the pick-up head is passed back and forth through the material. When the head 43 reaches the end of the car, the carriage direction is reversed and the carriage is also lowered a further 12 inches. At the same time the motor 104 is momentarily energized to rock the upper head 80 and tilt the pick-up head 43 to its other 30° operating position.

Thus the head is tilted and lowered at the end of each stroke to unload the chips in one more or less continuous operation. Occasionally it will be found that the material has become packed by its own weight or perhaps the moisture in the load will have frozen. If such conditions are encountered the packed or frozen mass of chips will be broken up by the raker bars 76 prior to being drawn up by hoisting mechanism.

The operation of the modified form of the invention is substantially as above described viz. the pick-up head is reciprocated through the material and is progressively lowered and tilted in the appropriate direction at the end of each stroke. This action results in the divided material being raised in same manner as before but rather than merely discharging the material near the load it is transferred by the pneumatic system to a remote point.

What I claim is:

1. Material handling apparatus comprising a frame, a pick-up head rockingly mounted on the free end of the frame and adapted to be advanced through a pile of material substantially parallel to a surface of said pile of material, said pick-up head having a pair of feed rolls spaced apart to define an intake throat, means for rocking the pick-up head to enter the trailing feed roll farther into the pile of material than the leading feed roll as said head is advanced through said pile of material and means for rotating the pair of feed rolls to sweep material from the pile of material into the intake throat.

2. Material handling apparatus as claimed in claim 1 wherein each of the pair of feed rolls has a cylindrical wall, a plurality of impeller blades extending longitudinally of the cylindrical wall, a raker blade adjacent to each impeller blade, said raker blades projecting beyond the outer edges of the impeller blades and being spirally wound around the periphery of the cylindrical wall.

3. Material handling apparatus comprising a frame, a pick-up head rockingly mounted on the free end of the frame and adapted to be advanced through a pile of material substantially parallel to the top surface of said pile of material and in a series of strokes, said pick-up head having a pair of feed rolls spaced apart to define an intake throat, means for rotating the pair of feed rolls to sweep material from the pile into the intake throat, means for rocking the pick-up head at the commencement of each stroke to dispose the leading feed roll above the trailing feed roll as said head is advanced through the pile of material and means for raising the material substantially vertically from the inlet throat to a discharge point remote from the pile of material.

4. Material handling apparatus comprising a frame, a pick-up head rockingly mounted on the lower end of the frame, a pair of feed rolls mounted on the pick-up head, said pair of feed rolls being spaced apart to define a material intake throat, a pair of pulleys mounted on the pick-up head one on each side of the intake throat, a rocking head mounted on an upper part of the frame, a pair of pulleys mounted on the rocking head, said rocking head pair of pulleys being spaced apart to define a material discharge opening, a pair of belts connecting the pick-up head pair of pulleys to the rocking head pair of pulleys, the opposing inner runs of the pair of belts providing a material-raising trough, means for counter-rotating the pair of feed rolls and the pair of belts and means for rocking the pick-up head.

5. Material handling apparatus as claimed in claim 4, and means for manipulating the frame to move the pick-up head horizontally and vertically through a pile of material.

6. Material handling apparatus as claimed in claim 4, wherein the frame has a horizontal conveyor adjacent to the rocking head and a deflector adapted to deflect material emitted from the discharge opening on to the horizontal conveyor.

7. Material handling apparatus as claimed in claim 4, wherein the frame has pressure plates over which the inner opposing runs of the pair of belts are trained and resilient means for urging the pressure plates towards one another.

References Cited by the Examiner

UNITED STATES PATENTS 2,851,143   9/1958   Kosetz _____ 198—9

EVON C. BLUNK, *Primary Examiner.*

RICHARD E. AEGERTER, *Examiner.*